United States Patent
Igarashi

(10) Patent No.: US 8,896,852 B2
(45) Date of Patent: Nov. 25, 2014

(54) DOCUMENT CREATING APPARATUS, OUTPUT APPARATUS, PRINTED MATERIAL, DOCUMENT OUTPUT SYSTEM, AND NON-TRANSITORY COMPUTER READABLE MEDIUM

(75) Inventor: Osamu Igarashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 169 days.

(21) Appl. No.: 13/569,399

(22) Filed: Aug. 8, 2012

(65) Prior Publication Data

US 2013/0242323 A1 Sep. 19, 2013

(30) Foreign Application Priority Data

Mar. 13, 2012 (JP) .................. 2012-055620

(51) Int. Cl.
*G06F 3/12* (2006.01)
*G06K 15/00* (2006.01)
*H04N 1/46* (2006.01)
*H04N 1/00* (2006.01)

(52) U.S. Cl.
CPC ............ *G06F 3/1204* (2013.01); *H04N 1/0035* (2013.01)
USPC ......... 358/1.13; 358/1.18; 358/1.9; 358/1.12; 358/505; 358/1.15

(58) Field of Classification Search
None
See application file for complete search history.

(56) References Cited

U.S. PATENT DOCUMENTS

| | | | |
|---|---|---|---|
| 6,633,303 B2 * | 10/2003 | Nakajima | 345/629 |
| 8,593,679 B2 * | 11/2013 | Miyata | 358/1.18 |
| 2005/0134896 A1 | 6/2005 | Koga | |
| 2005/0144469 A1 | 6/2005 | Saitoh | |
| 2008/0320604 A1 * | 12/2008 | Nakajima et al. | 726/28 |
| 2011/0292457 A1 * | 12/2011 | Miyata | 358/406 |

FOREIGN PATENT DOCUMENTS

| | | | |
|---|---|---|---|
| JP | 2005-165844 A | 6/2005 | |
| JP | 2005-166023 A | 6/2005 | |
| JP | 2007-304804 A | 11/2007 | |

* cited by examiner

*Primary Examiner* — Satwant Singh
(74) *Attorney, Agent, or Firm* — Sughrue Mion, PLLC

(57) ABSTRACT

A document creating apparatus includes a partial region setting unit, an output control information generating unit, and a printing unit. The partial region setting unit sets partial regions for document data. The output control information generating unit generates output control information regarding the partial regions set by the partial region setting unit. The printing unit prints, onto a printing medium, the document data, position information regarding the partial regions set by the partial region setting unit, and the output control information generated by the output control information generating unit.

17 Claims, 14 Drawing Sheets

FIG. 6A

Content(A){
  Access(All)
  Rectangle(10:50, 50:100)
} — OUTPUT CONTROL INFORMATION REGARDING PARTIAL REGION A Content(B){
  Access(M:Allow, G:Deny)
  Region(100:140, 210:220)
} — OUTPUT CONTROL INFORMATION REGARDING PARTIAL REGION B

FIG. 6B

Content(A){
  Access(All)
  Rectangle(10:50, 50:100)
} — OUTPUT CONTROL INFORMATION REGARDING PARTIAL REGION A Content(B){
  Access(M:Allow, G:Deny)
  Region(5, 100:170, 150:140, 210:160, 180:220, 130, 200)
} — OUTPUT CONTROL INFORMATION REGARDING PARTIAL REGION B

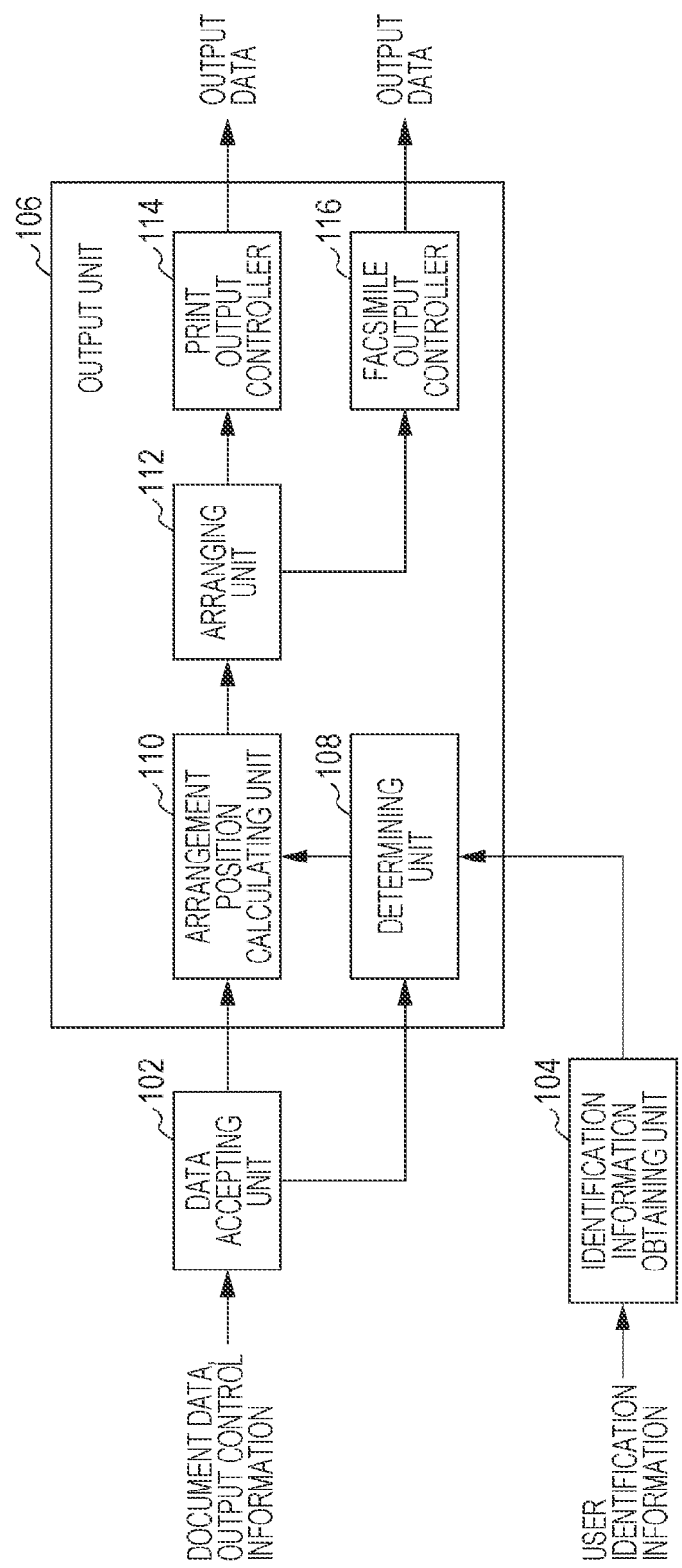

DOCUMENT CREATING APPARATUS, OUTPUT APPARATUS, PRINTED MATERIAL, DOCUMENT OUTPUT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-055620 filed Mar. 13, 2012.

BACKGROUND

Technical Field

The present invention relates to a document creating apparatus, an output apparatus, printed material, a document output system, and a non-transitory computer readable medium.

SUMMARY

According to an aspect of the invention, there is provided a document creating apparatus including a partial region setting unit, an output control information generating unit, and a printing unit. The partial region setting unit sets partial regions for document data. The output control information generating unit generates output control information regarding the partial regions set by the partial region setting unit. The printing unit prints, onto a printing medium, the document data, position information regarding the partial regions set by the partial region setting unit, and the output control information generated by the output control information generating unit.

BRIEF DESCRIPTION OF THE DRAWINGS

An exemplary embodiment of the present invention will be described in detail based on the following figures, wherein:

FIGS. 6A and 6B are schematic diagrams illustrating examples of output control information generated by an output control information generating unit;

FIG. 9 is a block diagram illustrating a functional configuration of the image forming apparatus serving as an output apparatus, which is achieved by executing a second program;

DETAILED DESCRIPTION

First, the meaning of terms will be described. "Document data" is data of a document including characters, figures, photographs, and the like, created by using application software or the like, and data of an image obtained through a reading operation performed by a reading device, such as a scanner. "Printed material" is a printing medium on which printing has been performed by a printing device, for example, a printing medium on which document data, and output control information or position information described below have been printed. "Printing medium" is a recording medium, such as paper on which printing is to be performed.

Hereinafter, an exemplary embodiment of the present invention will be described in detail with reference to the attached drawings.

Figure 1:
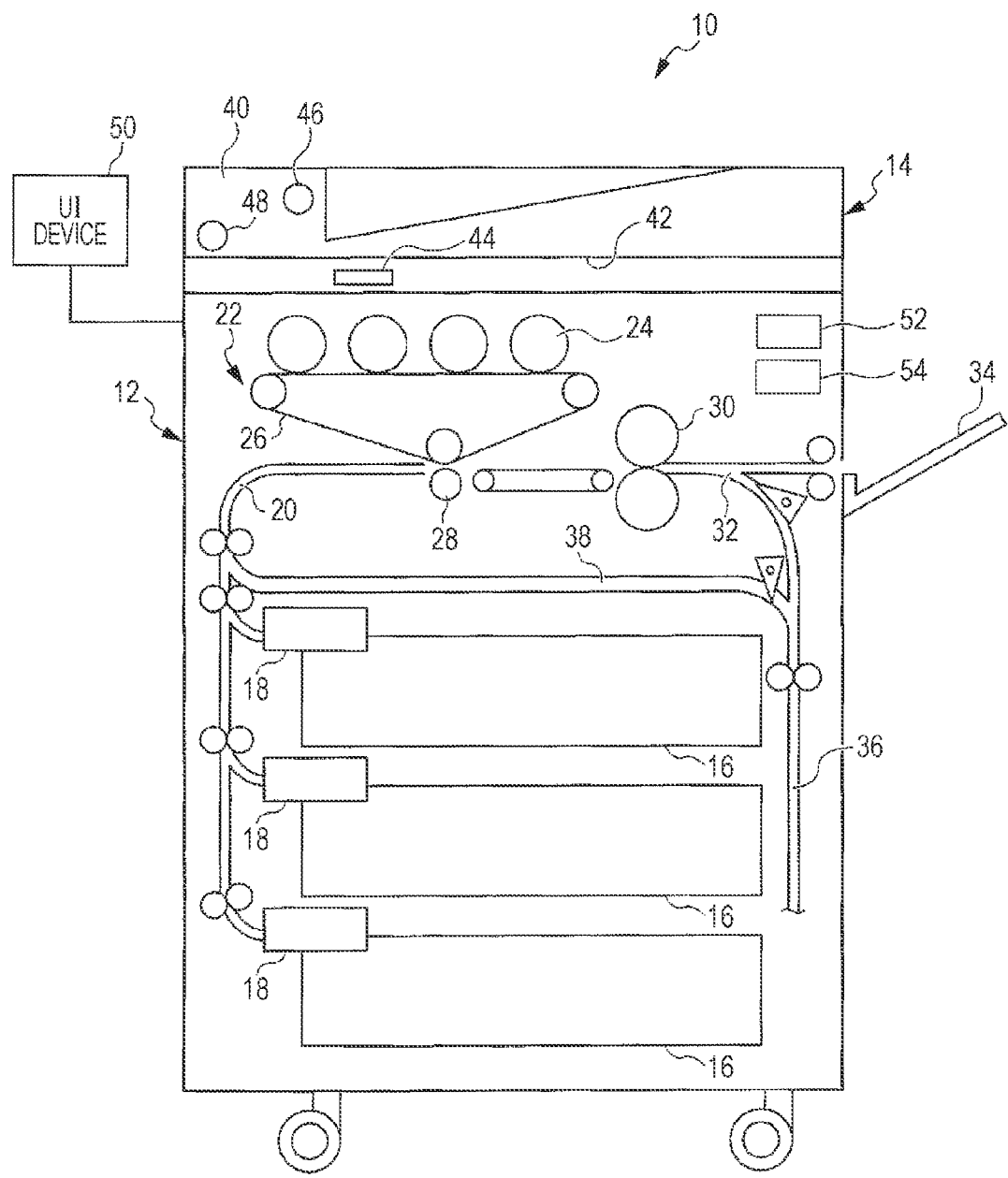
FIG. 1 is a cross-sectional diagram illustrating an image forming apparatus according to an example of an exemplary embodiment of the present invention.

FIG. 1 is a cross-sectional diagram illustrating an image forming apparatus 10 according to an example of the exemplary embodiment. The image forming apparatus 10 functions as a document creating apparatus based on a first program (described below) and as an output apparatus based on a second program (described below). Hereinafter, description will be given of the image forming apparatus 10 in which the document creating apparatus and the output apparatus are integrally configured, but the document creating apparatus and the output apparatus may be configured separately from each other. Alternatively, the document creating apparatus may have the function of the output apparatus, or the output apparatus may have the function of the document creating apparatus. The document creating apparatus and the output apparatus constitute a document output system.

The image forming apparatus 10 includes a printing device 12 and an image reading device 14. The printing device 12 includes printing medium supply cassettes 16 in three stages. Each of the printing medium supply cassettes 16 is provided with a supply head 18.

Upon one of the printing medium supply cassettes 16 being selected, the corresponding supply head 18 operates. Accordingly, a printing medium is supplied from the selected printing medium supply cassette 16 to an image forming unit 22 via a printing medium supply path 20.

The image forming unit 22 includes photoconductors 24 for yellow, magenta, cyan, and black, and also includes an intermediate transfer belt 26. Toner that absorbs infrared rays may be used.

A charging device, an exposure device, a developing device, a first transfer device, a cleaning device, and so forth (not illustrated) are arranged around each of the photoconductors 24. Toner images formed on the individual photoconductors 24 are transferred onto the intermediate transfer belt 26.

The toner images on the intermediate transfer belt 26 are transferred by a second transfer roller 28 onto a printing medium supplied thereto, and are fixed by a fixing device 30 to the printing medium. The printing medium to which the toner images have been fixed is output to an output unit 34 via a printing medium output path 32.

When double-sided printing is set, a printing medium to which toner images have been fixed on its front side by the fixing device 30 is transported from the printing medium output path 32 to a reversing device 36. The printing medium is reversed by the reversing device 36, transported to a printing medium reversing path 38, returned to the printing medium supply path 20, and transported to the image forming unit 22. Then, printing is performed on the back side.

The image reading device 14 includes an auto document feeder 40 that is capable of reading both sides of a document. A document is fed by the auto document feeder 40 onto a platen 42, and is read by a reading unit 44, which includes a charge-coupled device (CCD) or the like, on the platen 42. The image reading device 14 may read, using the reading unit 44, a document placed on the platen 42 by a user.

The auto document feeder 40 includes a document setting detector 46, which detects whether or not a document has been set. The auto document feeder 40 also functions as a platen cover. A document may be placed on the platen 42 by opening the platen cover. Opening and closing of the platen cover may be detected by a platen cover opening/closing detector 48.

A user interface device (UI device) 50 is provided integrally with the image forming apparatus 10 or is connected to the image forming apparatus 10 via a network. The UI device 50 is constituted by a touch panel or the like, and is capable of accepting an instruction regarding a processing condition from a user to the image forming apparatus 10, or displaying information.

The image forming apparatus 10 also includes a modem 52 for facsimile connected to a public line, and a network communication device 54 connected to a network, such as a local area network (LAN). The image forming apparatus 10 performs facsimile transmission and reception by using the modem 52. The image forming apparatus 10 transmits data to a terminal connected to the network or receives data from a terminal connected to the network by using the network communication device 54.

Figure 2:
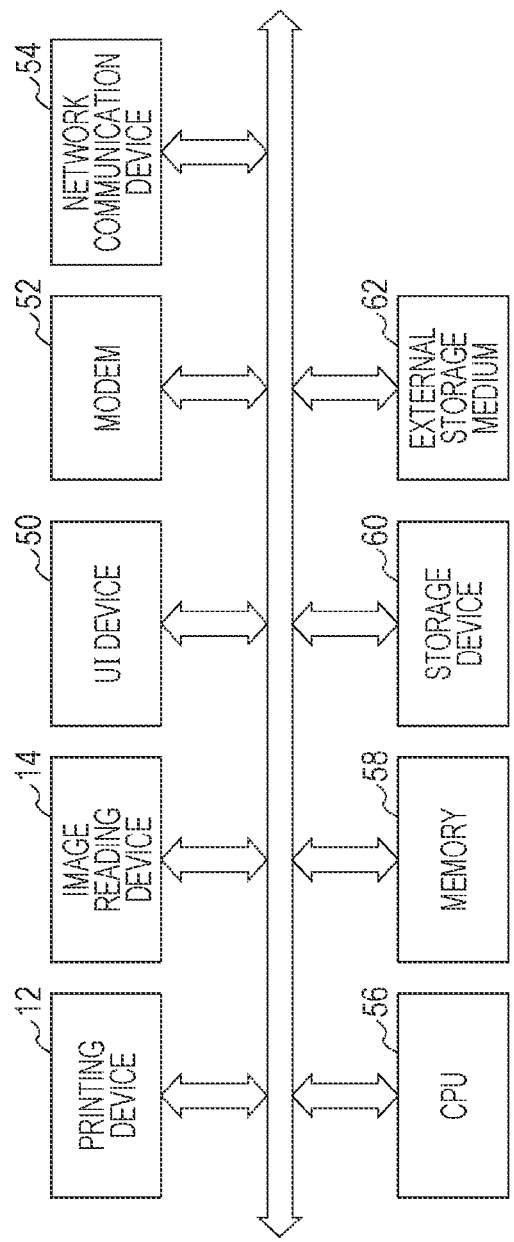
FIG. 2 is a block diagram illustrating a hardware configuration of the image forming apparatus.

FIG. 2 is a block diagram illustrating a hardware configuration of the image forming apparatus 10.

As illustrated in FIG. 2, the image forming apparatus 10 includes the above-described printing device 12, image reading device 14, UI device 50, modem 52, and network communication device 54, and also includes a central processing unit (CPU) 56, a memory 58, and a storage device 60. These devices are connected to one another via a bus. As illustrated in FIG. 2, a portable external storage medium 62, such as a universal serial bus (USB) memory, may be connected to the image forming apparatus 10.

As described above, the image forming apparatus 10 has a configuration as a computer capable of performing information processing and communication with another apparatus.

The CPU 56 executes the first program or second program, which will be described below, written on the memory 58 or the storage device 60, and thereby controls the operation of the image forming apparatus 10. An input accepted via the UI device 50 is transmitted to the CPU 56, and display information provided from the CPU 56 is transmitted to the UI device 50.

The CPU 56 may execute the first program or second program stored in a storage medium, such as a USB memory or a compact disc-read only memory (CD-ROM), or may execute the first program or second program provided via the network communication device 54.

The storage device 60 and the external storage medium 62 store, for example, document data read by the image reading device 14 or document data transmitted from a terminal connected to the network.

Next, partial output control of a document will be described for the case of copying printed material. Copying of printed material may be realized by, for example, printing out document data, which is obtained by reading printed material using the image reading device 14, by using the printing device 12. In this case, for example, not the entire image on the printed material is copied, but part of the image is copied. This is an example of partial output control of a document.

Figure 3:
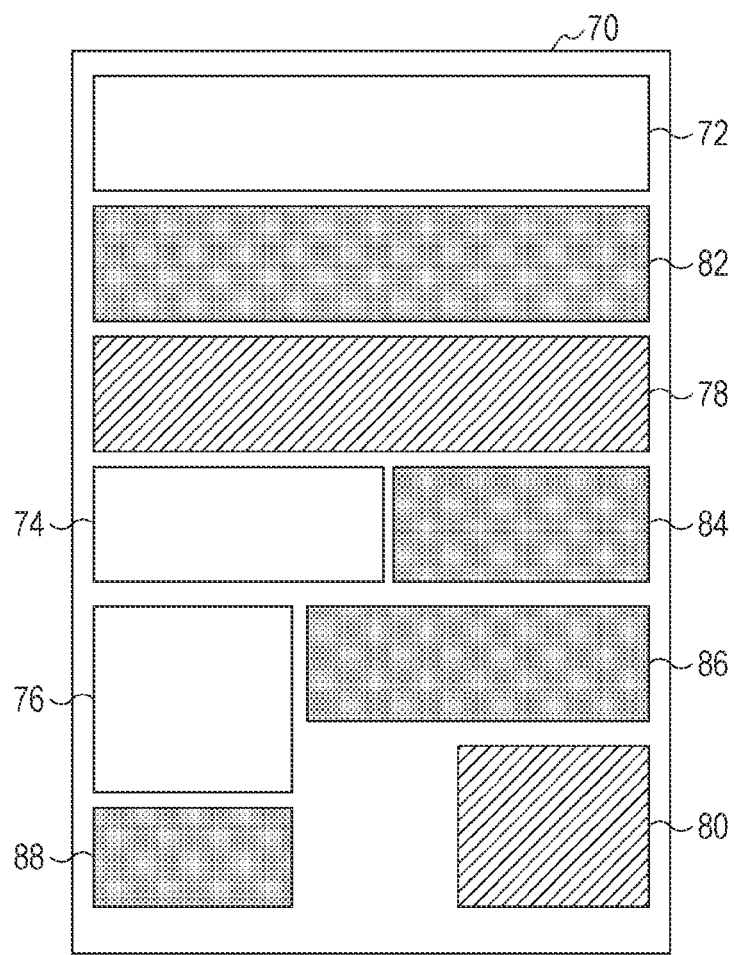
FIG. 3 is a schematic diagram illustrating partial copying of printed material.

FIG. 3 is a schematic diagram illustrating partial copying of printed material. Here, in the case of copying printed material 70, output control is performed so that all users are allowed to copy partial regions 72, 74, and 76 of the printed material 70, and that specific users, such as regular employees or a group of such users (hereinafter referred to as "users G"), are additionally allowed to copy partial regions 78 and 80. Also, another type of specific users, such as managers or a group of such users (hereinafter referred to as "users M"), are, in addition to the partial regions 72, 74, and 76, allowed to copy partial regions 82, 84, 86, and 88. In this case, when a user G copies the printed material 70, the partial regions 82, 84, 86, and 88 are not copied. When a user M copies the printed material 70, the partial regions 78 and 80 are not copied.

An example of output control in the case of performing copying has been described above regarding partial output control of a document. The output control may be applied to any types of output process, for example, transmitting document data by facsimile, or transmitting document data by network communication. The output control may be control of an output condition, and may include, for example, control for changing a color or density of an object to be output, as well as control for determining whether or not output is to be performed. In the example illustrated in FIG. 3, control for outputting partial regions varies depending on users. However, information regarding the users may not be used for output control. For example, output control may be performed so that every user is not allowed to copy the partial regions 78 and 80.

Partial output control of a document is performed in accordance with output control information. Here, output control information is the information used for controlling output performed by the output apparatus when document data is output by the output apparatus. The output control information may be, for example, control information indicating whether or not output is to be performed, or control information indicating an output condition, such as an output density. Output control information regarding partial regions is the information which is used for controlling output of the partial regions in an output range of document data when the document data is output from the output apparatus.

Next, the image forming apparatus 10 serving as a document creating apparatus will be described.

Figure 4:
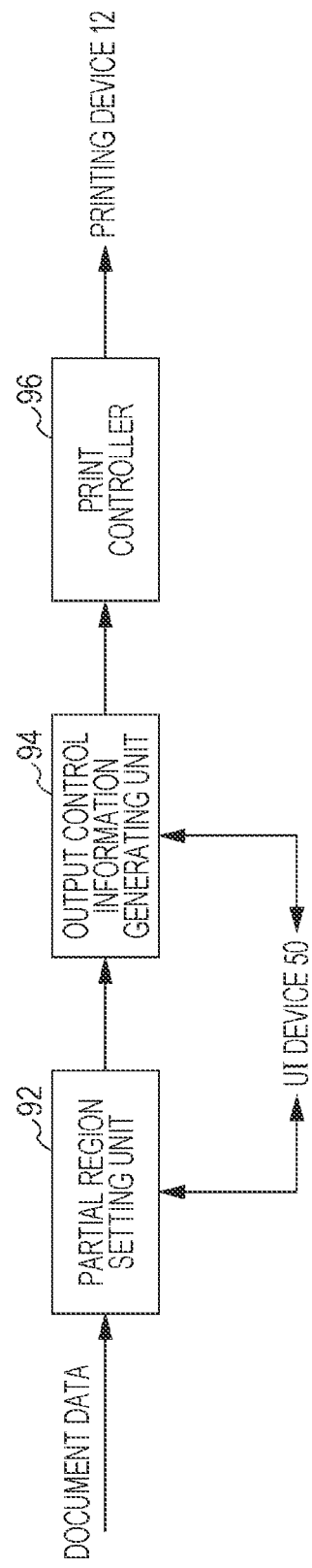
FIG. 4 is a block diagram illustrating a functional configuration of the image forming apparatus serving as a document creating apparatus, which is achieved by executing a first program.

FIG. 4 is a block diagram illustrating a functional configuration of the image forming apparatus 10 serving as a document creating apparatus, which is achieved by executing the first program. All or part of the functions of the first program may be realized by hardware, for example, by an application specific integrated circuit (ASIC) provided in the image forming apparatus 10.

As illustrated in FIG. 4, the image forming apparatus 10 serving as a document creating apparatus includes a partial region setting unit 92, an output control information generating unit 94, and a print controller 96. With this configuration, output control information regarding partial regions and position information regarding the partial regions are printed on a printing medium, and thereby printed material is created. Hereinafter, printed material having output control information and position information regarding partial regions printed thereon will be referred to as "printed material with output control information". The printed material with output control information undergoes partial output control, such as partial copying by the output apparatus, which will be described below.

The partial region setting unit 92 sets a partial region as a target of output control. In the exemplary embodiment, the partial region setting unit 92 performs setting of a partial region on input document data. Specifically, the partial region setting unit 92 sets a partial region in a printing range of input document data.

Figure 5A:
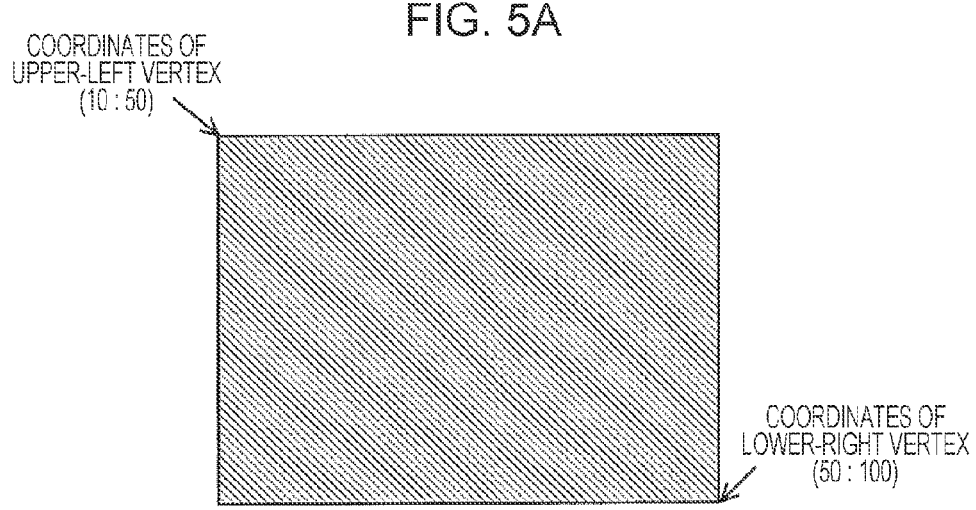
FIGS. 5A and 5B are schematic diagrams illustrating setting of a partial region performed by a partial region setting unit.
Figure 5B:
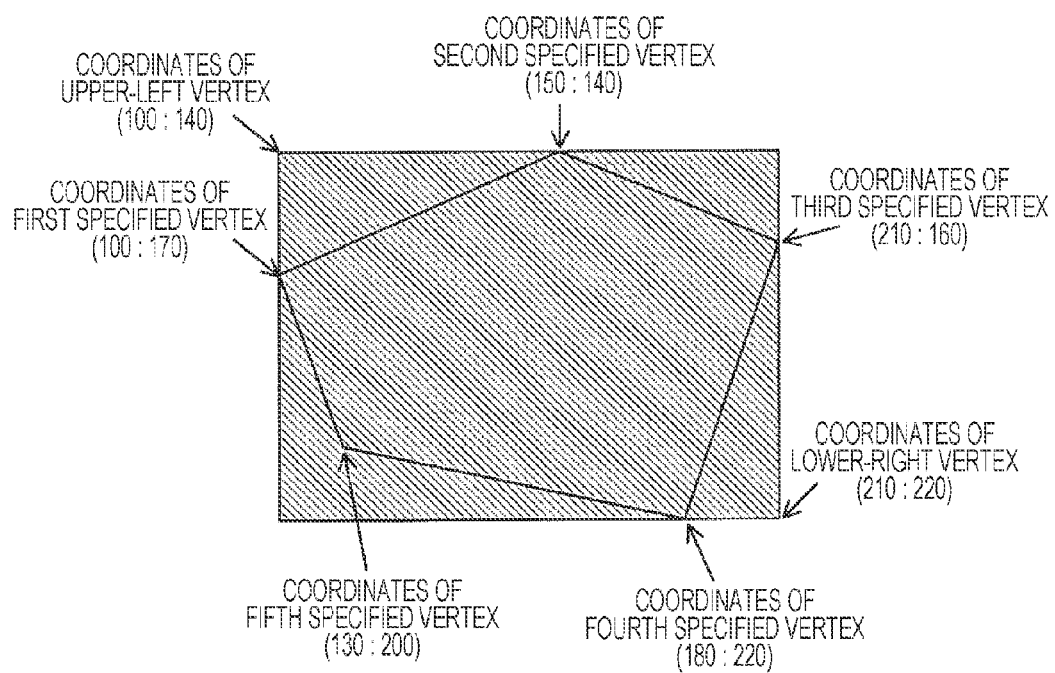

FIGS. 5A and 5B are schematic diagrams illustrating setting of a partial region performed by the partial region setting unit 92.

The partial region setting unit 92 according to the exemplary embodiment sets a partial region in accordance with specification of coordinates accepted via the UI device 50. A user performs specification of coordinates on document data displayed on the UI device 50, for example.

FIG. 5A illustrates an example of a case where the coordinates of two points defining a rectangular region are specified. The hatched area is set as a partial region. FIG. 5B illustrates an example of a case where the coordinates of the vertices of a polygon are specified. The hatched area is set as a partial region. As illustrated in FIG. 5B, when the coordinates of the vertices of a polygon are specified, the partial region setting unit 92 according to the exemplary embodiment sets a rectangle circumscribing the polygon as a partial region. The partial region setting unit 92 according to the exemplary embodiment specifies a partial region by using the coordinates of an upper-left vertex and a lower-right vertex among the vertices of the rectangle.

When the coordinates of the vertices of a polygon are specified, the region of the polygon may be set as a partial region. The partial region setting unit 92 according to the exemplary embodiment sets a partial region in accordance with specification information regarding coordinates provided from a user. Alternatively, for example, the partial region setting unit 92 may automatically set a partial region by analyzing document data.

The output control information generating unit 94 generates information that defines output control for a partial region set by the partial region setting unit 92. The output control information generating unit 94 according to the exemplary embodiment accepts, via the UI device 50, specification of an output control method for each partial region, and generates output control information corresponding to the accepted output control method.

FIGS. 6A and 6B are schematic diagrams illustrating examples of output control information generated by the output control information generating unit 94. FIG. 6A illustrates an example of a case where the partial region setting unit 92 has set a circumscribing rectangle as a partial region in response to specification of the coordinates of the vertices of a polygon. FIG. 6B illustrates an example of a case where the partial region setting unit 92 has set a polygon as a partial region in response to specification of the coordinates of the vertices of the polygon.

The output control information illustrated in FIG. 6A indicates that all users are allowed to perform output, such as copying, on a partial region A, which is defined as a rectangular region specified by the coordinates of an upper-left vertex (10, 50) and the coordinates of a lower-right vertex (50, 100). Also, the output control information indicates that users M are allowed to perform output on a partial region B, which is defined as a rectangular region specified by the coordinates of an upper-left vertex (100, 140) and the coordinates of a lower-right vertex (210, 220), but users G are not allowed to perform output thereon.

The output control information regarding the partial region B illustrated in FIG. 6B indicates that users M are allowed to perform output on the partial region B, which is defined as a polygonal region specified by the coordinates of five vertices (100, 170), (150, 140), (210, 160), (180, 220), and (130, 200), but users G are not allowed to perform output thereon.

In the examples illustrated in FIGS. 6A and 6B, the output control information indicates both of that users M are allowed to perform output on the partial region B and that users G are not allowed to perform output on the partial region B. Alternatively, the output control information may indicate one of them.

The output control information may be defined for each type of output. For example, the output control information regarding the partial region A may be control information defining that all users are allowed to perform copying thereon, but only users M are allowed to perform facsimile transmission thereon.

The output control information illustrated in FIGS. 6A and 6B includes position information indicating the position of a partial region to be controlled, as well as information indicating output control of the partial region. Alternatively, the position information may be managed separately from the output control information.

The print controller 96 performs control so that position information regarding a partial region set by the partial region setting unit 92 and output control information generated by the output control information generating unit 94 are printed on a printing medium by the printing device 12. The print controller 96 according to the exemplary embodiment performs control so that document data, position information, and output control information are printed on a printing medium in a superimposed manner. The printing device 12 performs printing in accordance with the control performed by the print controller 96, thereby creating printed material with output control information.

Specifically, the print controller 96 generates a code image composed of dot arrays corresponding to output control information and position information, and prints the code image and an image of document data in a superimposed manner. Also, the print controller 96 performs control so that the printing device 12 prints a code image by using a toner which absorbs infrared rays and prints an image of document data by using a toner which does not absorb infrared rays. The printed matter created in this manner is irradiated with infrared rays so that dot arrays are read. Accordingly, the output control information and the position information are obtained.

The manner of printing document data, output control information, and position information in a superimposed manner is not limited as long as all of them are printed. For example, the output control information and the position information may be embedded as electronic watermarks, or may be printed as two-dimensional code images. The output control information and the position information may be printed in a visible manner or in an invisible manner.

The configuration of the image forming apparatus 10 serving as a document creating apparatus has been described. In the description given above, a partial region is set for document data, and the document data and output control information regarding the partial region are printed on a printing medium. Alternatively, the document data may not be necessary.

For example, pieces of output control information regarding individual partial regions of paper may be printed on the paper. If additional information is written on the paper (in handwriting or printing), partial output control may be performed when outputting (for example, copying) the paper with the additional information. In order to perform this, the partial region setting unit 92 may set partial regions in a region of a printing medium, and the print controller 96 may perform control to print output control information and position information.

Figure 7:
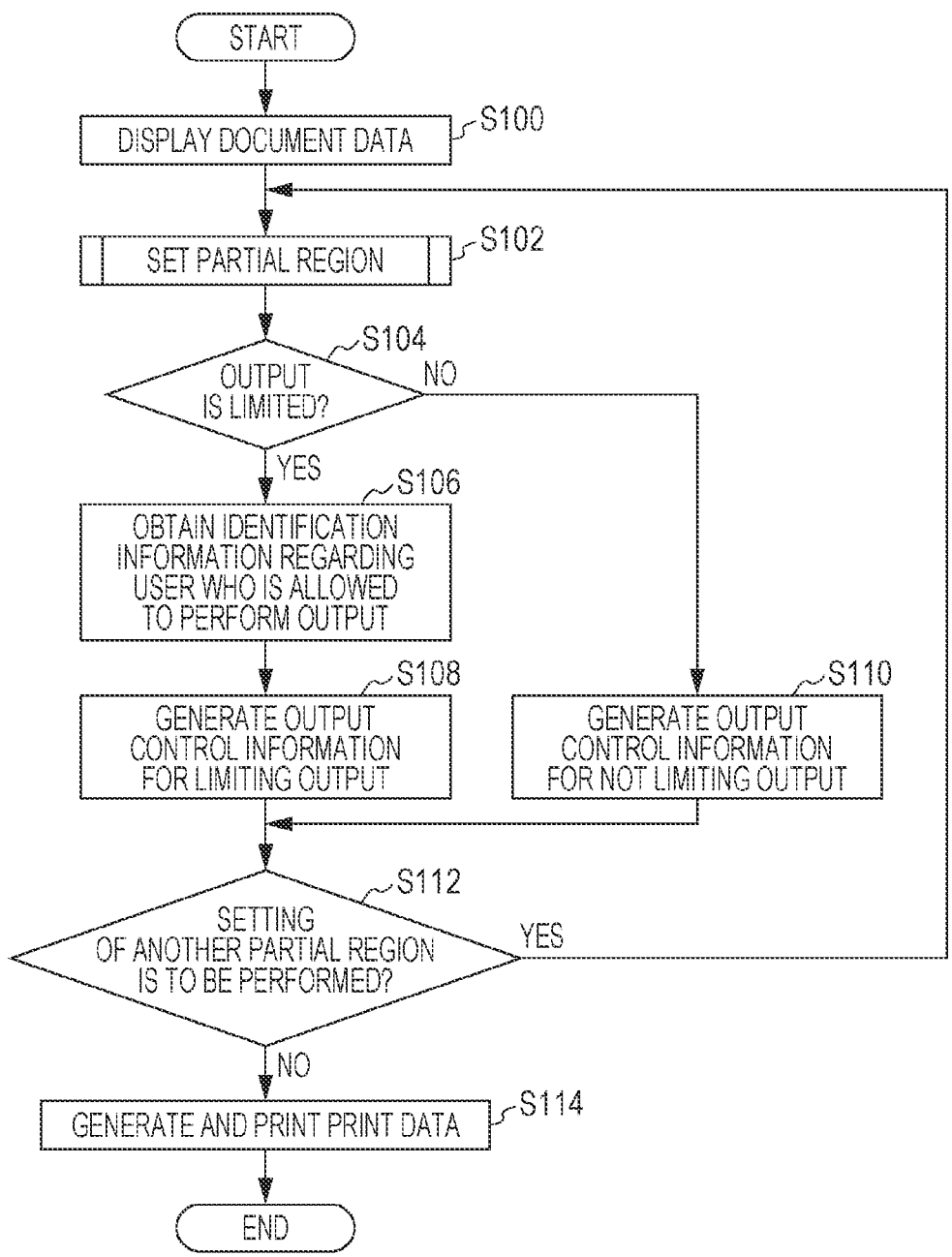
FIG. 7 is a flowchart illustrating a process of generating printed material with output control information.

FIG. 7 is a flowchart illustrating a process of generating printed material with output control information.

In step S100, the UI device 50 displays document data.

In step S102, the partial region setting unit 92 sets a partial region. The setting of a partial region will be described below with reference to the flowchart illustrated in FIG. 8.

In step S104, the output control information generating unit 94 determines whether or not specification for limiting output of the partial region set in step S102 has been accepted via the UI device 50. If specification for limiting output has been accepted, the process proceeds to step S106. If specification for not limiting output has been accepted, the process proceeds to step S110.

In step S106, the output control information generating unit 94 obtains identification information identifying a user who is allowed to perform output. The identification information is input via the UI device 50, for example. The output control information generating unit 94 obtains the input identification information.

In step S108, the output control information generating unit 94 generates output control information indicating that output is limited. In the exemplary embodiment, the output control information generating unit 94 generates output control information including position information regarding the partial region set in step S102. Specifically, for example, the output control information generating unit 94 generates the output control information regarding the partial region B illustrated in FIGS. 6A and 6B.

In step S110, the output control information generating unit 94 generates output control information indicating that output is not limited. In the exemplary embodiment, the output control information generating unit 94 generates output control information including position information regarding the partial region set in step S102. Specifically, for example, the output control information generating unit 94 generates the output control information regarding the partial region A illustrated in FIGS. 6A and 6B.

In step S112, the partial region setting unit 92 determines whether or not setting of another partial region is to be performed. If the partial region setting unit 92 determines that setting of another partial region is not to be performed, the process proceeds to step S114. If the partial region setting unit 92 determines that setting of another partial region is to be performed, the process returns to step S102, where setting of another partial region is performed. The partial region setting unit 92 determines whether or not setting of another partial region is to be performed in accordance with, for example, an input via the UI device 50.

In step S114, the print controller 96 generates a code image of dot arrays regarding the generated output control information, and controls the printing device 12 so as to print the code image and an image of the document data in a superimposed manner. Accordingly, the printing device 12 creates printed material with output control information. Since the printed material with output control information has the output control information attached to the printed material itself. Thus, it is not necessary for the output apparatus (described below) to store the output control information in advance.

In the example described above, output control information indicating that output is not limited is generated for the partial region set in step S102. Alternatively, neither setting of a partial region nor generation of output control information may be performed on a region where output is not limited.

Figure 8:
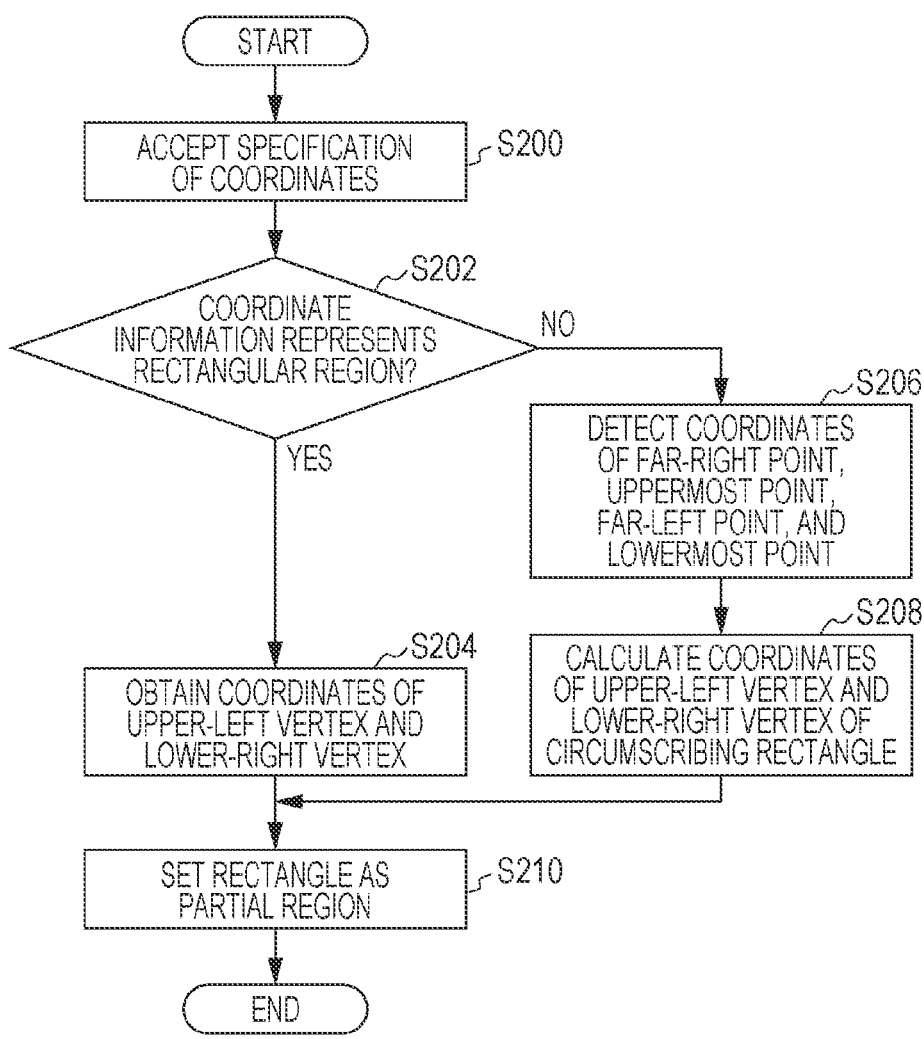
FIG. 8 is a flowchart illustrating a process of setting a partial region performed in step S102 in FIG. 7.

FIG. 8 is a flowchart illustrating a process of setting a partial region, which is performed in step S102 illustrated in FIG. 7.

In step S200, the partial region setting unit 92 accepts, via the UI device 50, an input of specification of coordinates in a region of document data. Here, description will be given of a case where the partial region setting unit 92 accepts an input of specification of the coordinates of two points, that is, an upper-left vertex and a lower-right vertex (input indicating a rectangular region), or an input of specification of the coordinates of the vertices of a polygon (input indicating a polygonal region).

In step S202, the partial region setting unit 92 determines whether or not accepted coordinate information represents a rectangular region. If the accepted coordinate information represents a rectangular region, the process proceeds to step S204. If the accepted coordinate information represents a polygonal region, the process proceeds to step S206.

In step S204, the partial region setting unit 92 obtains coordinate information regarding the upper-left vertex and coordinate information regarding the lower-right vertex (see FIG. 5A).

In step S206, the partial region setting unit 92 detects, among the coordinates of plural points specified in step S200, the coordinates of the far-right point, the uppermost point, the far-left point, and the lowermost point. Then, the process proceeds to step S208.

In step S208, the partial region setting unit 92 calculates the coordinates of the upper-left vertex and the lower-right vertex of the rectangle circumscribing the polygon, by using the coordinates detected in step S206 (see FIG. 5B).

In step S210, the partial region setting unit 92 sets the rectangle defined by the coordinates of the upper-left vertex and the lower-right vertex as a partial region. In this example, the coordinates of the upper-left vertex and the lower-right vertex serve as position information.

Next, the image forming apparatus 10 serving as an output apparatus will be described.

FIG. 9 is a block diagram illustrating a functional configuration of the image forming apparatus 10 serving as an output apparatus, which is achieved by executing the second program. All or part of the functions of the second program may be realized by hardware, for example, by an ASIC provided in the image forming apparatus 10.

As illustrated in FIG. 9, the image forming apparatus 10 serving as an output apparatus includes a data accepting unit 102, an identification information obtaining unit 104, and an output unit 106. The output unit 106 includes a determining unit 108, an arrangement position calculating unit 110, an arranging unit 112, a print output controller 114, and a facsimile output controller 116. With this configuration, printed material with output control information, which is created by the above-described document creating apparatus, is read, and document data obtained thereby is output.

The data accepting unit 102 accepts document data, output control information, and position information regarding partial regions. The data accepting unit 102 according to the exemplary embodiment accepts document data, output control information, and position information regarding partial regions which are obtained by reading, with the image reading device 14, printed material with output control information created by the above-described document creating apparatus.

The output unit 106 performs, in accordance with output control information, partial output control on the partial regions defined by position information of the document data accepted by the data accepting unit 102, and performs print output or facsimile output of the document data. The output process performed by the output unit 106 is not limited. Examples of the output process include an output process for storing document data in the storage device 60 or the external storage medium 62, an output process using communication via the network communication device 54, and an output process for displaying document data on the UI device 50.

The identification information obtaining unit 104 obtains identification information identifying a user who is to perform an output process on the document data accepted by the data accepting unit 102. The identification information is obtained via an authentication device (not illustrated), for example. The authentication device obtains identification information through input thereof performed by a user or reading of the identification information from an IC card or magnetic card presented by a user.

The determining unit 108 determines an output method for each partial region of the document data accepted by the data accepting unit 102, in accordance with the output control information accepted by the data accepting unit 102 and the identification information obtained by the identification information obtaining unit 104. In the exemplary embodiment, the determining unit 108 determines, in units of partial regions specified by the position information, whether or not data is to be output.

The arrangement position calculating unit 110 calculates the position in an output region of a partial region that has been determined to be output. When there is a certain partial region that has been determined not to be output by the determining unit 108, the arrangement position calculating unit 110 according to the exemplary embodiment calculates positions so that a partial region that has been determined to be output is arranged at the position of the certain partial region.

The arranging unit 112 arranges partial regions to be output at the positions calculated by the arrangement position calculating unit 110, thereby generating output data. When there is a certain partial region that has been determined not to be output by the determining unit 108, the arranging unit 112 according to the exemplary embodiment arranges a partial region that has been determined to be output at the position of the certain partial region, as described above. Alternatively, the arranging unit 112 may arrange the partial region that has been determined to be output at the same position as the position originally set in the document data.

Figure 10C:
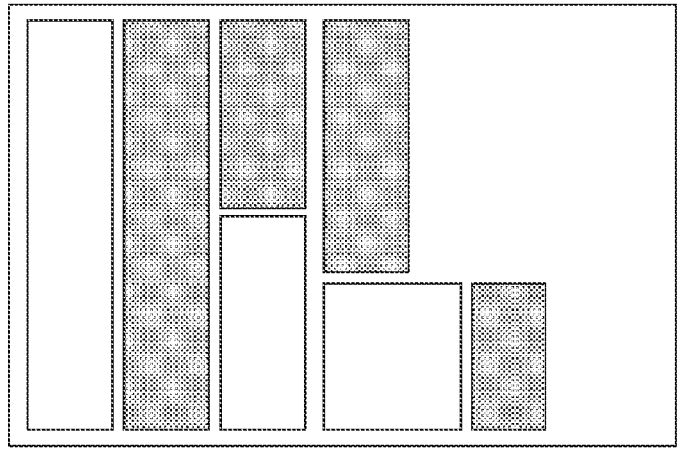
FIGS. 10A, 10B, and 10C are schematic diagrams illustrating examples of the arrangement of partial regions performed by an arranging unit according to the exemplary embodiment.
Figure 10B:
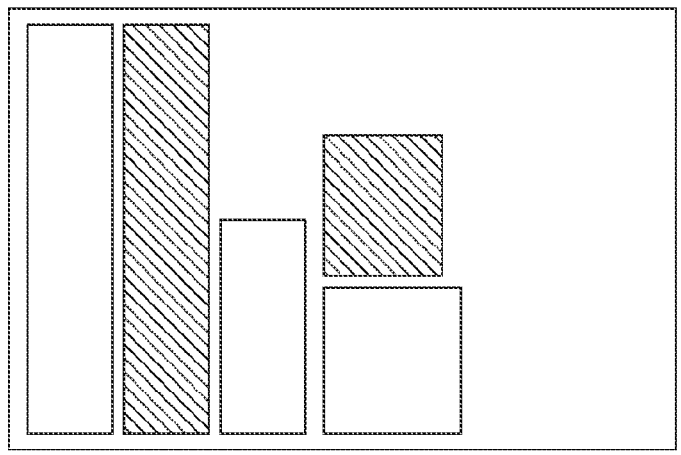
Figure 10A:
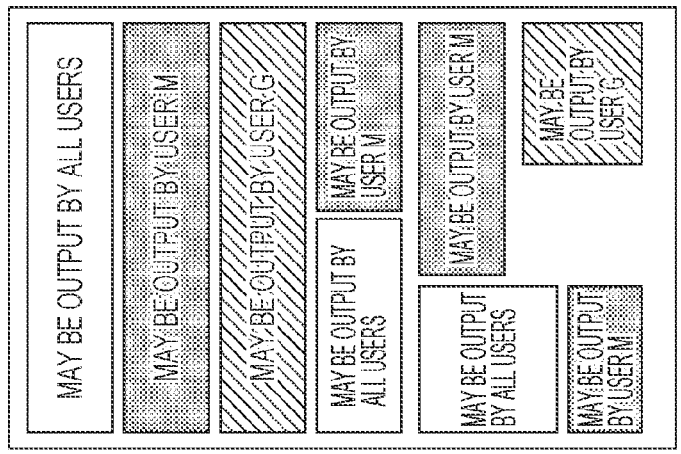

FIGS. 10A, 10B, and 10C are schematic diagrams illustrating examples of the arrangement of partial regions performed by the arranging unit 112 according to the exemplary embodiment.

FIG. 10A illustrates document data accepted by the data accepting unit 102. For the convenience of description, rectangular partial regions are illustrated. Among them, white partial regions are partial regions which all users are allowed to output, hatched partial regions are partial regions which users G are allowed to output, and shaded partial regions are partial regions which users M are allowed to output.

FIGS. 10B and 10C illustrate the partial regions that are arranged by the arranging unit 112 in accordance with the output control illustrated in FIG. 10A. FIG. 10B illustrates a case where identification information regarding a user G has been obtained by the identification information obtaining unit 104, and FIG. 10C illustrates a case where identification information regarding a user M has been obtained by the identification information obtaining unit 104. As illustrated in FIGS. 10B and 10C, the arranging unit 112 according to the exemplary embodiment changes the position of at least one of the partial regions, and then outputs document data. For example, as illustrated in FIGS. 10B and 10C, the arranging unit 112 moves, to the positions of the partial regions not to be output, the partial regions to be output, and then outputs document data.

The details of the arrangement of partial regions will be described below with reference to a flowchart.

In the case of printing the document data accepted by the data accepting unit 102, the print output controller 114 performs control so that output data which is composed of the partial regions arranged by the arranging unit 112 is printed by the printing device 12.

In the case of transmitting the document data accepted by the data accepting unit 102 by facsimile, the facsimile output controller 116 performs control so that output data which is composed of the partial regions arranged by the arranging unit 112 is transmitted by facsimile via the modem 52 for facsimile.

When an output condition other than a condition indicating whether or not output is allowed is specified in output control information, the print output controller 114 or the facsimile output controller 116 performs control so that output is performed under the specified output condition.

The configuration of the image forming apparatus 10 serving as an output apparatus has been described. In the example descried above, the data accepting unit 102 accepts data which is generated by reading printed material with output control information created by the above-described document creating apparatus. The document data and the output control information or position information accepted by the data accepting unit 102 are not limited to those printed on a printing medium, but may be managed as electronic data.

As described above, the output apparatus controls output in units of partial regions regardless of whether or not the document data is data generated by reading printed material. When there is a certain partial region not to be output, the output apparatus arranges a partial region to be output at the position of the certain partial region, regardless of whether or not the document data is data generated by reading printed material. With this arrangement, a recording medium (paper or the like) onto which data is output is efficiently used, and an inefficient arrangement in which partial regions are scattered may be prevented.

Figure 11A:
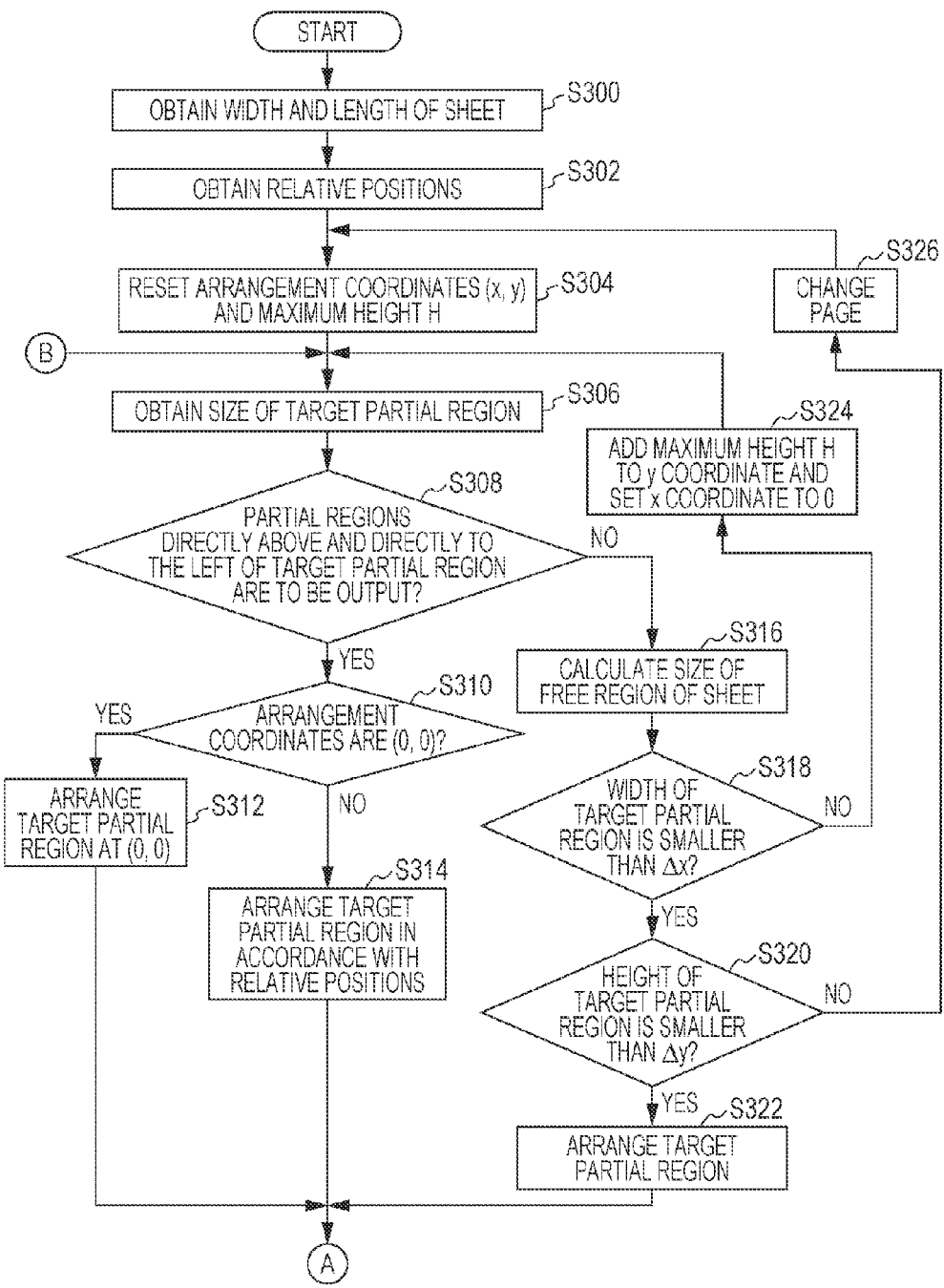
FIGS. 11A and 11B illustrate a flowchart of a process of arranging partial regions.
Figure 11B:
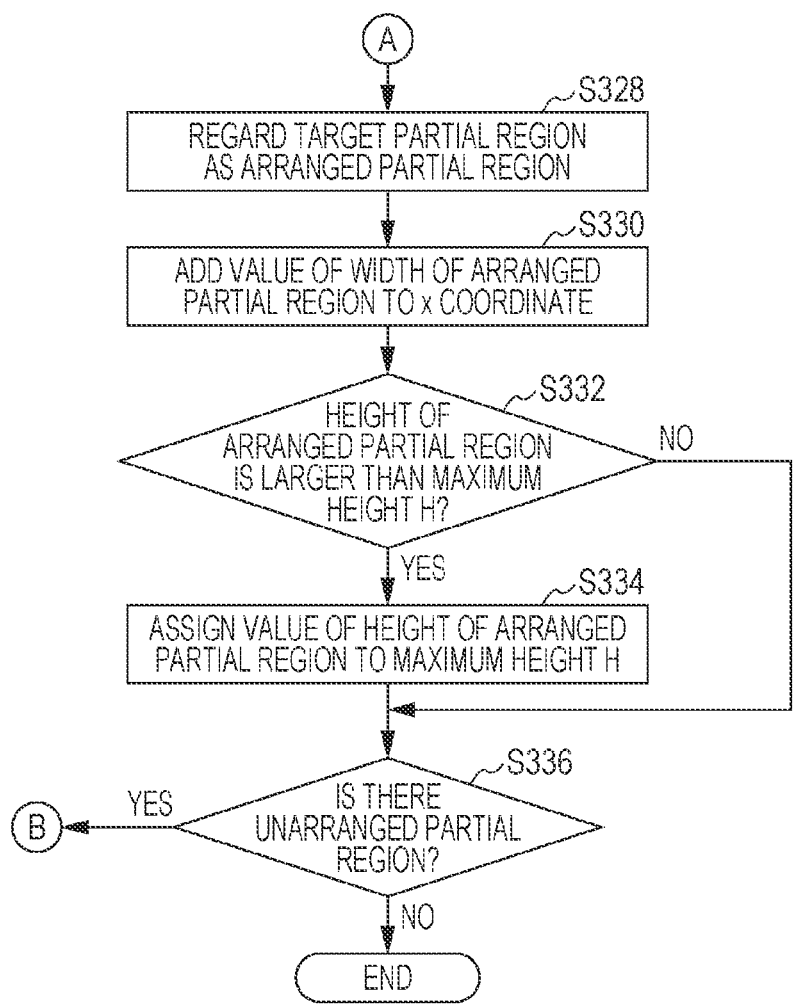

FIGS. 11A and 11B illustrate a flowchart of a process of arranging partial regions.

In step S300, the arrangement position calculating unit 110 obtains, as the size of an output region, the width and length of one page of a sheet to which data is to be output.

In step S302, the arrangement position calculating unit 110 obtains relative positions of individual partial regions, which are specified by position information accepted by the data accepting unit 102, with respect to the partial regions directly thereabove and the partial regions directly to the left thereof.

In step S304, the arrangement position calculating unit 110 resets arrangement coordinates (x, y) and a maximum height H of arranged regions, so that (x, y)=(0, 0) and H=0. Here, for example, the upper-left vertex of the output region (size of sheet) is regarded as an origin, an x axis is set in the right direction, and a y axis is set in the downward direction, so as to indicate positions in the output region. The arrangement coordinates (x, y) serve as a variable for specifying the coordinate position where the upper-left vertex of a partial region to be output is positioned. The maximum height H of arranged regions serves as a variable for specifying the height of the partial region having the largest height among partial regions horizontally arranged in a line.

In step S306, the arrangement position calculating unit 110 obtains the size of a partial region to be arranged (hereinafter referred to as a "target partial region"). In the exemplary embodiment, the arrangement position calculating unit 110 specifies the size with reference to the position information.

In step S308, the arrangement position calculating unit 110 determines whether or not the partial region directly above the target partial region is a partial region to be output, and whether or not the partial region directly to the left of the target partial region is a partial region to be output. If both the partial regions directly above and directly to the left of the target partial region are partial regions to be output, the process proceeds to step S310. Otherwise, the process proceeds to step S316.

In step S310, the arrangement position calculating unit 110 determines whether or not the arrangement coordinates are set to (0, 0). If the arrangement coordinates are set to (0, 0), the process proceeds to step S312. Otherwise, the process proceeds to step S314.

In step S312, the arranging unit 112 arranges the target partial region so that the upper-left vertex thereof is positioned at the coordinates (0, 0), and the process proceeds to step S328.

In step S314, the arranging unit 112 arranges the target partial region in accordance with the relative position with respect to the partial region directly above the target partial region and the relative position with respect to the partial region directly to the left of the target partial region, and the process proceeds to step S328.

In step S316, the arrangement position calculating unit 110 calculates the size of a free region of the sheet by using the size of sheet obtained in step S300 and the arrangement coordinates. Specifically, the arrangement position calculating unit 110 calculates a free amount $\Delta x$ on the right side of the arrangement coordinates by using an expression $\Delta x=$(width of sheet)-(x coordinate of arrangement coordinates). Also, the arrangement position calculating unit 110 calculates a free amount $\Delta y$ on the lower side of the arrangement coordinates by using an expression $\Delta y=$(length of sheet)-(y coordinate of arrangement coordinates).

In step S318, the arrangement position calculating unit 110 determines whether or not the width of the target partial region is smaller than the value $\Delta x$. If the width is smaller than the value $\Delta x$, the process proceeds to step S320. Otherwise, the process proceeds to step S324.

In step S320, the arrangement position calculating unit 110 determines whether or not the height of the target partial region is smaller than the value $\Delta y$. If the height is smaller than the value $\Delta y$, the process proceeds to step S322. Otherwise, the process proceeds to step S326.

In step S322, the arranging unit 112 arranges the target partial position so that the upper-left vertex thereof is at the arrangement coordinates, and the process proceeds to step S328.

In step S324, the arrangement position calculating unit 110 adds the maximum length H to the y coordinate of the arrangement coordinates, and sets the x coordinate of the arrangement coordinates to 0. Then, the process returns to step S306.

In step S326, the arranging unit 112 regards the next page as a page on which partial regions are to be arranged, and the process returns to step S304.

In step S328, the arranging unit 112 regards the target partial region that has been arranged as an arranged partial region.

In step S330, the arrangement position calculating unit 110 adds the value of the width of the partial region that is regarded as an arranged partial region in step S328 to the x coordinate of the arrangement coordinates.

In step S332, the arrangement position calculating unit 110 determines whether or not the height of the partial region that is regarded as an arranged partial region in step S328 is larger than the maximum height H. If the height is larger than the maximum height H, the process proceeds to step S334. Otherwise, the process proceeds to step S336.

In step S334, the arrangement position calculating unit 110 assigns, to the maximum height H, the value of the height of the partial region that is regarded as an arranged partial region in step S328.

In step S336, the arranging unit 112 determines whether or not there is an unarranged partial region among the partial regions to be output. If there is an unarranged partial region, the process returns to step S306 to continue the arrangement process. If there is no unarranged partial region, the arrangement process ends.

With the above-described process, the arrangement of partial regions illustrated in FIGS. 10B and 10C is performed.

The arranging unit 112 may output predetermined information to the position of a partial region not to be output, instead of outputting the partial region.

Figure 12A:
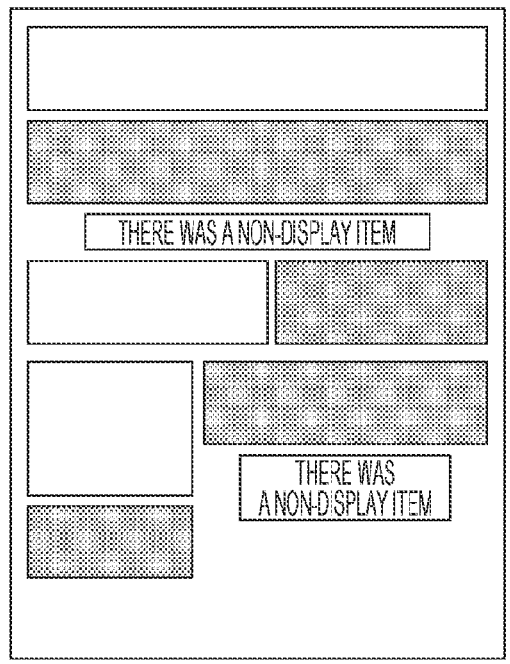
FIGS. 12A and 12B are schematic diagrams illustrating examples of arranging images of information indicating that there were partial regions not to be output in original document data, in the case of arranging partial regions to be output by changing the positions thereof.
Figure 12B:
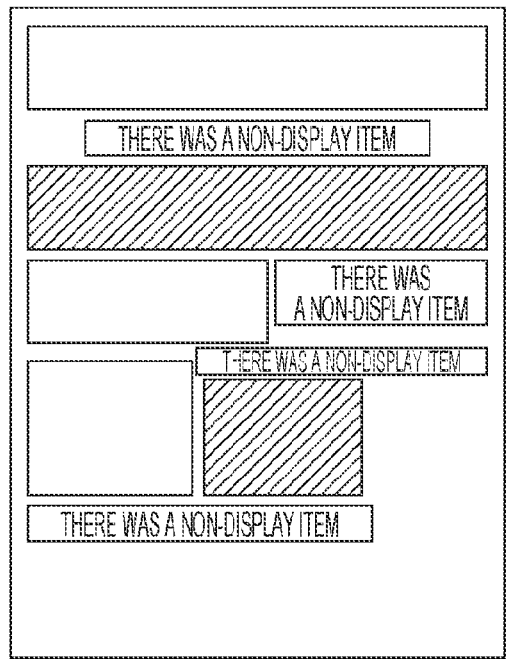

FIGS. 12A and 12B are schematic diagrams illustrating examples of arranging images of information indicating that original document data has partial regions not to be output, in the case of arranging partial regions to be output by changing the positions thereof. As illustrated in FIGS. 12A and 12B, images with a message "there was a non-display item" are output as information images indicating that there were partial regions not to be output.

In the examples illustrated in FIGS. 12A and 12B, predetermined information is output to the positions of partial regions not to be output, and partial regions to be output are arranged by changing the positions thereof. Alternatively, the partial regions to be output may be arranged without changing the positions thereof, and the predetermined information may be output.

Figure 13A:
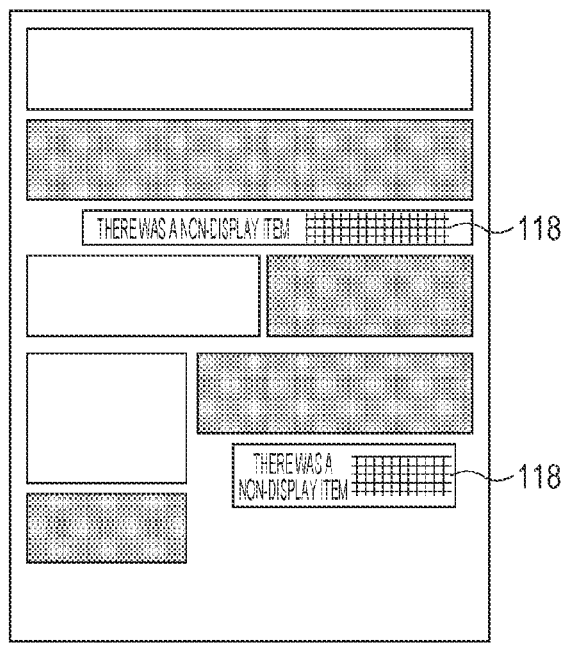
FIGS. 13A and 13B are schematic diagrams illustrating examples of code images output from the image forming apparatus serving as an output apparatus.
Figure 13B:
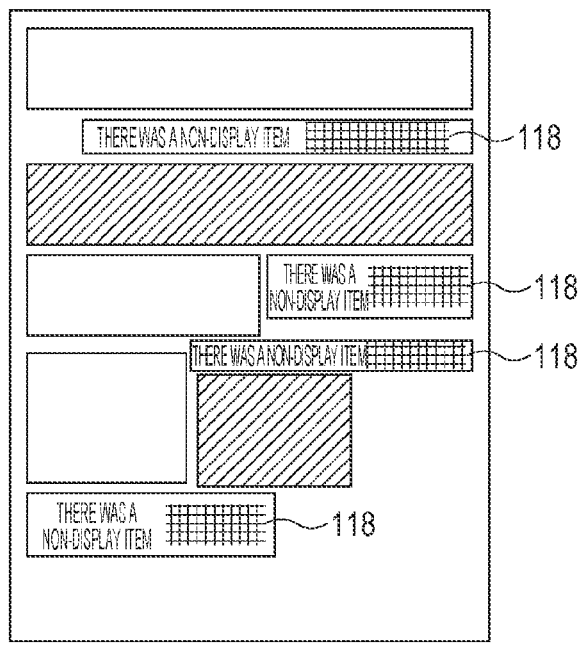

The output unit 106 may further output code images 118, as illustrated in FIGS. 13A and 13B. Each of the code images 118 is code information generated by encoding document data in a partial region not to be output. In this case, for example, the output unit 106 also outputs the output control information and position information accepted by the data accepting unit 102. The data accepting unit 102 accepts the document data, code information, output control information, and position information output by the output unit 106 in this manner. The output unit 106 may output the accepted document data and the document data obtained by decoding code information, in accordance with the output control information and position information accepted by the data accepting unit 102.

For example, it is assumed that, in certain printed material P, output control is performed so that a user M is allowed to output a partial region A and a user G is not allowed to output the partial region A, and output control is performed so that users M and G are allowed to output a partial region B. In this case, if the user G copies the printed material P, printed material Q is generated in which only the partial region B is printed in a visible manner and the partial region A is printed as a code image. At this time, if the user M receives the printed material Q and causes the image forming apparatus 10 serving as an output apparatus to read and output the printed material Q, the encoded partial region A is decoded, and the partial regions A and B are output.

In the examples illustrated in FIGS. 13A and 13B, the code images 118 are output at the positions of the partial regions not to be output. However, the output positions may be other positions in the output region. Each of the code images 118 may be a code image composed of dot arrays, as described above, or may be a two-dimensional code or a bar code. The code image 118 may be embedded as an electronic watermark. The output unit 106 may not output control information and position information, and may output partial regions to be output and code information representing partial regions not to be output.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document creating apparatus comprising:
    a partial region setting unit that sets partial regions for document data;
    an output control information generating unit that generates output control information regarding the partial regions set by the partial region setting unit;
    a printing unit that prints, onto a printing medium, the document data, position information regarding the partial regions set by the partial region setting unit, and the output control information generated by the output control information generating unit;
    an accepting unit that accepts the document data which is obtained by reading printed material generated through printing performed by the printing unit, the output control information regarding the partial regions set for the document data, and the position information regarding the partial regions obtained by reading the printed material generated through printing performed by the printing unit; and
    an output unit that outputs the document data accepted by the accepting unit in accordance with the output control information and the position information accepted by the accepting unit,
    wherein the output unit changes an arrangement of at least one of the partial regions in accordance with the position information accepted by the accepting unit, and then outputs the document data.

2. The document creating apparatus according to claim 1, wherein the output control information generating unit generates, as the output control information, certain information indicating whether or not output of the partial regions is allowed, and identification information regarding a user to which the certain information is applicable.

3. The document creating apparatus according to claim 1, wherein the output unit changes an arrangement by moving, to a position of a partial region that is determined as a non-target to be output in accordance with the output control information, a partial region that is determined as a target to be output in accordance with the output control information, and then outputs the document data.

4. The document creating apparatus according to claim 1, wherein the output control information generating unit controls output from a copying device, which copies a printing medium on which printing has been performed by the printing unit.

5. The document creating apparatus according to claim 1, wherein the output control information generating unit controls output from a transmitting device, which transmits data generated by reading a printing medium on which printing has been performed by the printing unit.

6. A document creating apparatus comprising:
    a partial region setting unit that sets partial regions for a printing medium;
    an output control information generating unit that generates output control information regarding the partial regions set by the partial region setting unit;
    a printing unit that prints, onto the printing medium, position information regarding the partial regions set by the partial region setting unit, and the output control information generated by the output control information generating unit;
    an accepting unit that accepts document data which is obtained by reading printed material generated through printing performed by the printing unit, the output control information regarding partial regions set for the document data, and the position information regarding the partial regions obtained by reading the printed material generated through printing performed by the printing unit; and
    an output unit that outputs the document data accepted by the accepting unit in accordance with the output control information and the position information accepted by the accepting unit,
    wherein the output unit changes an arrangement of at least one of the partial regions in accordance with the position information accepted by the accepting unit, and then outputs the document data.

7. The document creating apparatus according to claim 6, wherein the output control information generating unit generates, as the output control information, certain information indicating whether or not output of the partial regions is allowed, and identification information regarding a user to which the certain information is applicable.

8. The document creating apparatus according to claim 6, wherein the output unit changes an arrangement by moving, to a position of a partial region that is determined as a non-target to be output in accordance with the output control information, a partial region that is determined as a target to be output in accordance with the output control information, and then outputs the document data.

9. The document creating apparatus according to claim 6, wherein the output control information generating unit controls output from a copying device, which copies a printing medium on which printing has been performed by the printing unit.

10. The document creating apparatus according to claim 6, wherein the output control information generating unit controls output from a transmitting device, which transmits data generated by reading a printing medium on which printing has been performed by the printing unit.

11. An output apparatus comprising:
    an accepting unit that accepts document data which is obtained by reading printed material, output control information regarding partial regions set for the document data, and position information regarding the partial regions; and an output unit that outputs the document data accepted by the accepting unit in accordance with the output control information and the position information accepted by the accepting unit, wherein the output unit outputs the document data in a partial region which is determined as a target to be output, code information generated by encoding document data in a partial region which is determined as a non-target to be output, the output control information accepted by the accepting unit, and the position information accepted by the accepting unit, the output apparatus further comprising:

a re-accepting unit that accepts the document data, the code information, the output control information, and the position information output by the output unit; and a re-output unit that outputs, in accordance with the output control information and the position information accepted by the re-accepting unit, the document data accepted by the re-accepting unit and document data obtained by decoding the code information accepted by the re-accepting unit.

12. The output apparatus according to claim 11, further comprising:

an identification information obtaining unit that obtains identification information identifying a user, wherein the output unit outputs the document data accepted by the accepting unit in accordance with the identification information obtained by the identification information obtaining unit, and the output control information and the position information accepted by the accepting unit.

13. The output apparatus according to claim 11, wherein the output unit outputs, in accordance with the position information accepted by the accepting unit, predetermined information to a position of a partial region which is determined as a non-target to be output in accordance with the output control information, instead of outputting the partial region in the document data.

14. A document output system comprising:

a document creating apparatus; and an output apparatus, the document creating apparatus including a partial region setting unit that sets partial regions for document data, an output control information generating unit that generates output control information regarding the partial regions set by the partial region setting unit, a printing unit that prints, onto a printing medium, the document data, position information regarding the partial regions set by the partial region setting unit, and the output control information generated by the output control information generating unit, and the output apparatus including an accepting unit that accepts document data which is obtained by reading printed material generated through printing performed by the printing unit of the document creating apparatus, output control information regarding partial regions set for the document data, and position information regarding the partial regions obtained by reading the printed material generated through printing performed by the printing unit of the document crating apparatus, and an output unit that outputs the document data accepted by the accepting unit in accordance with the output control information and the position information accepted by the accepting unit, wherein the output unit changes an arrangement of at least one of the partial regions in accordance with the position information accepted by the accepting unit, and then outputs the document data.

15. A non-transitory computer readable medium storing a program causing a computer to execute a process, the process comprising:

setting partial regions for document data;

generating output control information regarding the set partial regions;

printing, onto a printing medium, the document data, position information regarding the set partial regions, and the generated output control information;

accepting the document data which is obtained by reading printed material generated through the printing, the output control information regarding the partial regions set for the document data, and the position information regarding the partial regions obtained by reading the printed material generated through the printing; and outputting the accepted document data in accordance with the accepted output control information and the accepted position information, wherein the outputting comprises changing an arrangement of at least one of the partial regions in accordance with the accepted position information, and then outputting the document data.

16. A non-transitory computer readable medium storing a program causing a computer to execute a process, the process comprising:

accepting document data which is obtained by reading printed material, output control information regarding partial regions set for the document data, and position information regarding the partial regions;

outputting the accepted document data in accordance with the accepted output control information and the accepted position information, wherein the outputting comprises outputting the document data in a partial region which is determined as a target to be output, code information generated by encoding document data in a partial region which is determined as a non-target to be output, the accepted output control information, and the accepted position information;

re-accepting the outputted document data, the code information, the output control information, and the position information; and re-outputting, in accordance with the re-accepted output control information and the re-accepted position information, the re-accepted document data and document data obtained by decoding the re-accepted code information.

17. A document creating apparatus comprising:

a processor;

memory storing executable instructions that, when executed by the processor, causes the processor to perform the steps of:

setting partial regions for document data;

generating output control information regarding the set partial regions;

printing, onto a printing medium, the document data, position information regarding the set partial regions, and the generated output control information;

accepting the document data which is obtained by reading printed material generated through the printing, the output control information regarding the partial regions set for the document data, and the position information regarding the partial regions obtained by reading the printed material generated through the printing; and outputting the accepted document data in accordance with the accepted output control information and the accepted position information, wherein the outputting comprises changing an arrangement of at least one of the partial regions in accordance with the accepted position information, and then outputting the document data.

* * * * *